United States Patent [19]

Dietz et al.

[11] Patent Number: 5,747,679
[45] Date of Patent: May 5, 1998

[54] METHOD FOR DETECTING COMBUSTION MISFIRES

[75] Inventors: Hartmut Dietz, Stuttgart; Klaus Ries-Müller, Bad Rappenau; Jürgen Förster, Chemnitz, all of Germany

[73] Assignee: Robert Bosch GmbH, Stuttgart, Germany

[21] Appl. No.: 707,495

[22] Filed: Sep. 25, 1996

[30] Foreign Application Priority Data

Sep. 25, 1995 [DE] Germany .................. 195 35 376.5
Aug. 16, 1996 [DE] Germany .................. 196 32 903.5

[51] Int. Cl.⁶ ......................................... G01M 15/00
[52] U.S. Cl. .................. 73/116; 73/117.3; 123/419; 123/436; 364/431.07
[58] Field of Search ............... 73/115, 116, 117.2, 73/117.3, 118.1; 364/431.07, 431.08; 123/419, 436

[56] References Cited

U.S. PATENT DOCUMENTS

| | | | |
|---|---|---|---|
| 5,056,360 | 10/1991 | Dosdall et al. | 73/116 |
| 5,105,372 | 4/1992 | Provost et al. | 73/116 |
| 5,200,899 | 4/1993 | Ribbens et al. | 73/116 |
| 5,303,158 | 4/1994 | Kuroda | 73/117.3 |
| 5,379,634 | 1/1995 | Kuroda et al. | 73/116 |
| 5,386,722 | 2/1995 | Meyer et al. | 73/117.3 |
| 5,387,253 | 2/1995 | Remboski et al. | 73/117.3 |
| 5,428,991 | 7/1995 | Klenk et al. | 73/116 |
| 5,433,107 | 7/1995 | Angermaier et al. | 73/117.3 |
| 5,452,604 | 9/1995 | Namiki et al. | 73/116 |
| 5,481,909 | 1/1996 | Deutsch et al. | 123/419 |
| 5,487,008 | 1/1996 | Ribbens et al. | 364/431.07 |
| 5,497,328 | 3/1996 | Sugai et al. | 73/116 |
| 5,508,927 | 4/1996 | Remboski et al. | 364/431.08 |
| 5,513,521 | 5/1996 | Klenk et al. | 73/116 |
| 5,544,058 | 8/1996 | Demizu et al. | 73/116 |

*Primary Examiner*—George M. Dombroske
*Attorney, Agent, or Firm*—Walter Ottesen

[57] ABSTRACT

The invention is directed to a method for detecting misfires in the combustion of a z-cylinder four stroke internal combustion engine wherein the engine includes a transducer wheel coupled to the crankshaft of the engine and rotating in phase synchronism with the crankshaft. The transducer wheel has typically z/2 segments and the segments are scanned with a sensor device to supply a segment-time signal reflecting the nonuniformity of the rotational movement of the crankshaft with respect to individual ones of the cylinders of the engine. Rough-running values are formed for each cylinder on the basis of the segment times with each of the rough-running values including a component occurring at the frequency of the crankshaft. The component is filtered out and then the filtered rough-running value is compared to a threshold value. A misfire is determined to be present when the filtered rough-running value exceeds the threshold value.

2 Claims, 8 Drawing Sheets

METHOD FOR DETECTING COMBUSTION MISFIRES

BACKGROUND OF THE INVENTION

Combustion misfires lead to an increase of the toxic substances emitted during operation of the engine and can, in addition, lead to damage of the catalytic converter in the exhaust-gas system of the engine. A detection of combustion misfires in the entire rpm and load ranges is necessary to satisfy statutory requirements as to on-board monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A detection system for combustion misfires includes the following function blocks: sensors, signal processing and feature extraction as well as classification. The sensors detect, for example, segment times, that is, the time intervals in which the crankshaft passes through a predetermined rotational angle. Feature signals are formed from the segment times in the feature extraction block. The classification block follows the feature extraction block and combustion misfires are detected from the feature signals, for example, by threshold value comparisons or by utilizing a neural network or other known methods.

A system operating on the basis of threshold-value comparisons is already known and disclosed in German patent publication 4,138,765 which corresponds to U.S. patent application Ser. No. 07/818,884, filed Jan. 10, 1992, now abandoned.

In accordance with this known method, a crankshaft angular region which is identified as a segment is typically assigned to a specific region of the piston movement of each cylinder. The segments are realized, for example, by markings on a transducer wheel coupled to the crankshaft. The segment time in which the crankshaft passes through this angular region is dependent, inter alia, on the energy converted in the combustion stroke. Misfires lead to an increase of the ignition-synchronously detected segment times. In accordance with the known method, a criterion for the rough-running of the engine is computed from the differences of sequential segment times. In addition, slow dynamic operations such as the increase of the engine rpm when a vehicle accelerates is compensated for by computations. A rough-running value is computed in this manner for each ignition and is likewise compared to a predetermined threshold value in synchronism with the ignition. This threshold value is dependent upon operating parameters such as load and rpm, as required, and a misfire is determined when this threshold value is exceeded.

The reliability of the known method is decisively dependent upon the determination of the segment time and therefore on the precision with which the markings are produced on the transducer wheel during manufacture. These mechanical inaccuracies can be eliminated arithmetically. In this connection, reference can be made to U.S. Pat. No. 5,428,991 which discloses the detection of segment times from, for example, three different transducer wheel segments during overrun operation. One of the three segments is considered as a reference segment. The deviations of the segment times of the two remaining segments with respect to the segment time of the reference segment are determined. Corrective values are formed from the deviations in such a manner that the segment times, which are determined in overrun operation and logically coupled to the corrective values, are the same.

This method requires a certain complexity with respect to the programming of the control apparatus and with respect to the complexity of the computations during operation of the vehicle.

SUMMARY OF THE INVENTION

It is an object of the invention to provide a simple method for detecting combustion misfires which is independent of the mechanical inaccuracy of the transducer wheel.

The method of the invention is for detecting misfires in the combustion of a z-cylinder four stroke internal combustion engine. The engine includes a transducer wheel coupled to the crankshaft of the engine and rotating in phase synchronism with the crankshaft. The method includes the steps of: causing the transducer wheel to have typically $z/2$ segments; scanning the segments with a sensor device to supply a segment-time signal reflecting the nonuniformity of the rotational movement of the crankshaft with respect to individual ones of the cylinders of the engine; forming rough-running values for each cylinder on the basis of the segment times with each of the rough-running values including a component occurring at the frequency of the crankshaft; filtering out the component; then, comparing the filtered rough-running value to a threshold value; and, determining a misfire to be present when the filtered rough-running value exceeds the threshold value.

An essential element of the applicants' invention is to make the segment times independent of the mechanical inaccuracies of the transducer wheel by filtering the segment times in advance of the formation of the rough-running value. The mechanical influences repeat with each revolution of the crankshaft. For this reason, and according to the invention, the signal component of the segment-time signal, which occurs at the crankshaft frequency, and its harmonics are filtered out in advance of the formation of the rough-running value.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
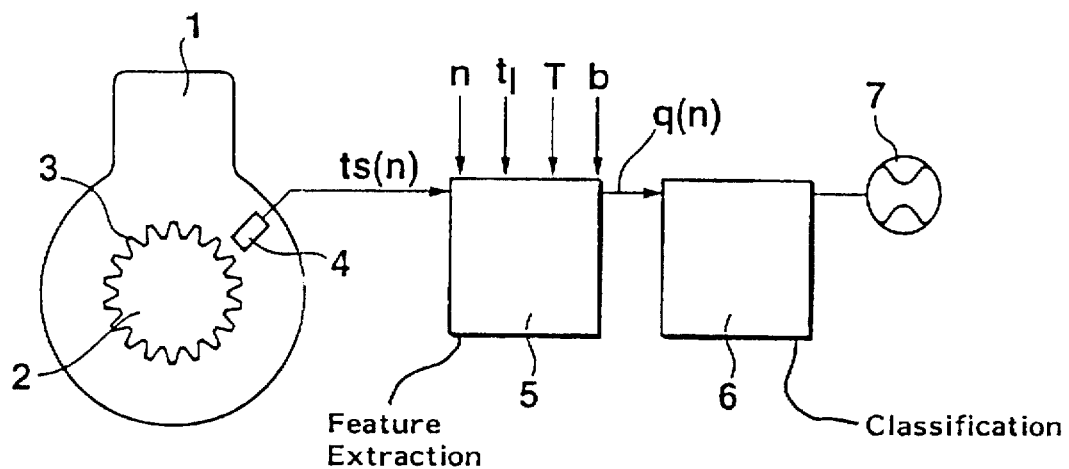
FIG. 1 is a schematic showing the technical background of the invention.

FIG. 1 shows an internal combustion engine 1 equipped with a sensor unit including an angle transducer wheel 2 which carries markings 3 and an angle sensor 4 as well as a block 5 symbolizing the feature extraction, a block 6 symbolizing the classification and a device 7 for displaying the occurrence of combustion misfires. The angle transducer wheel 2 is coupled to the crankshaft of the internal combustion engine 1 and the rotational movement thereof is converted into an electrical signal with the aid of the angle sensor 4. The angle sensor 4 is realized as an inductive sensor and the periodicity of the electrical signal defines a map of the periodic passing of the markings 3 at the angle sensor 4. The time duration between an increase and a decrease of the signal level therefore corresponds to the time in which the crankshaft has rotated through an angle region corresponding to the extent of one marking.

The segment times are processed in the subsequent stages.

Figure 2:
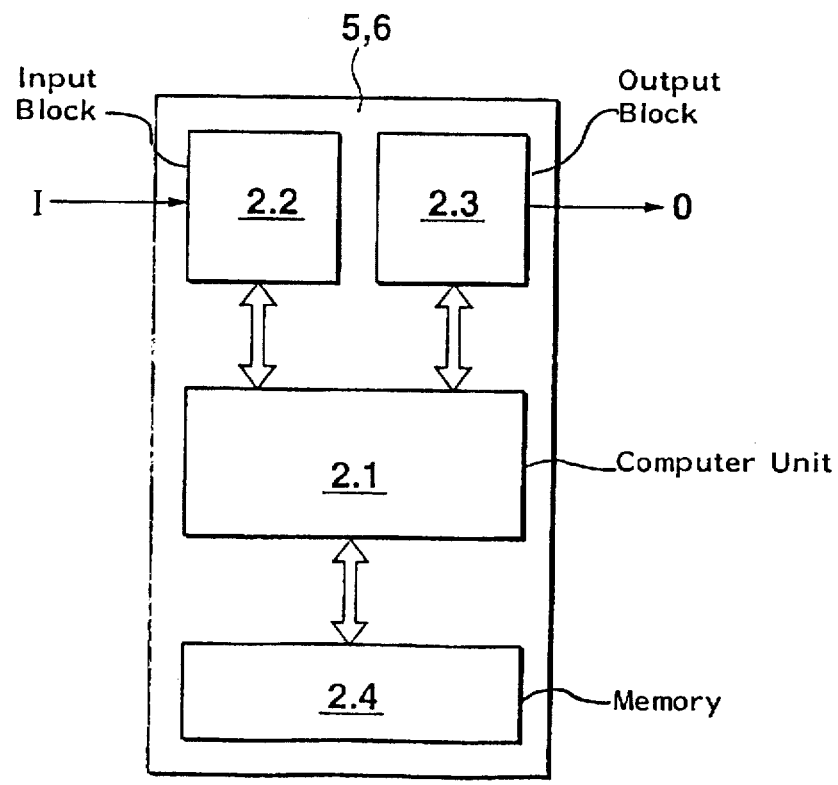
FIG. 2 is a block diagram showing a computer suitable for carrying out the method of the invention.

The computer used for this purpose can, for example, be configured as shown in FIG. 2. In FIG. 2, a computer unit 2.1 arbitrates between an input block 2.2 and an output block 2.3 while utilizing programs and data stored in a memory 2.4.

Figure 3A:
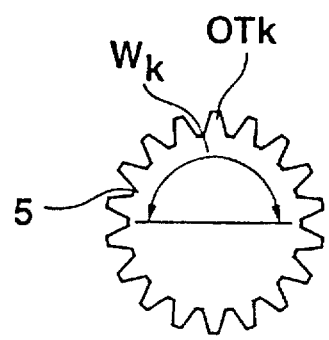
FIGS. 3a and 3b make clear the known principle for forming the segment times as a basis of a criterion for the rough running on the basis of rpm measurements and how a rough-running value can be made incorrect by the influence of the transducer wheel.

FIG. 3a shows the angle transducer wheel subdivided into two segments. Each of the two segments has a predetermined number of markings. The marking OTk is the top dead center point of the piston movement of the k-th cylinder of an internal combustion engine. This top dead center point lies in the combustion stroke of this cylinder. In this example, the engine is a four cylinder engine (z=4).

An angular region $W_k$ is defined about this top dead center point and, in this embodiment, this angular region extends over half of the markings of the angle transducer wheel. In the same manner, angular regions $W_1$ to $W_4$ are assigned to the combustion strokes of the remaining cylinders. Here, the starting point is the 4-stroke principle wherein the crankshaft rotates twice for a complete work cycle. For this reason, the region $W_1$ of the first cylinder corresponds to the region $W_3$ of the third cylinder and so on. The position, length and number of segments can be changed specifically to an application. Accordingly, mutually overlapping segments are possible, that is, more than z segments per camshaft revolution or different positions of the segments with respect to the top dead center points of the cylinders. The use of a segment-time signal as input signal for the feature extraction stage is therefore advantageous because it can be computed in a motor control from already available signals.

In lieu of the segment times, the mean rpm trace can be used which is assigned to the individual crankshaft regions.

The subdivision into z segments per camshaft revolution is used as an example in the following embodiments.

Further input signals of the feature extraction stage are the engine rpm n, load $t_1$, engine temperature T and a signal b for identifying the first cylinder.

Figure 3B:
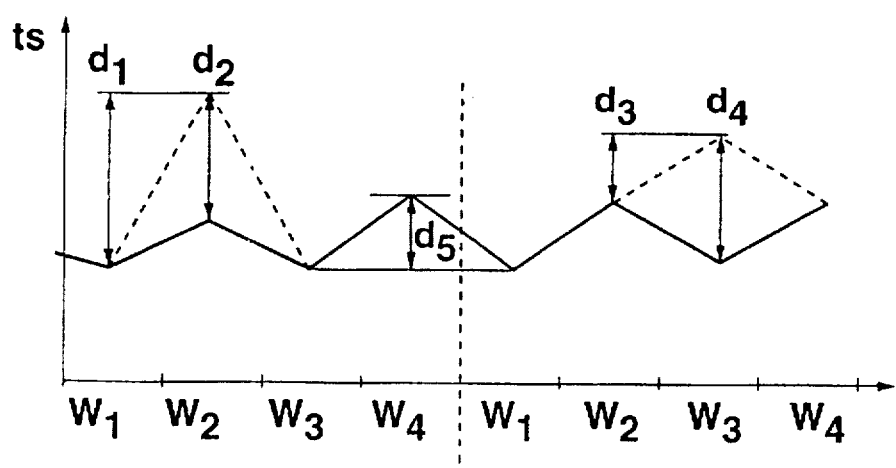

In FIG. 3b, the times ts are plotted along the vertical axis and are the times in which the angular ranges are passed through by the rotational movement of the crankshaft. First, a mechanical inaccuracy of the transducer wheel is assumed which leads to a lengthening of each second segment time. The solid line defines the trace of the segment time which adjusts during misfire-free operation. In the left half of FIG. 3b, a misfire in a cylinder is assumed at the dotted line and the segment time thereof is already comparatively long because of the influence of the transducer wheel. In contrast, the right half shows the case of a misfire in a cylinder whose segment times are measured as too short because of the influence of the transducer wheel. The lack of torque caused by the misfire leads, in each case, to an increase of the corresponding time span ts. The relative increases in lengths $d_2$ and $d_4$ of the segment times are assumed to be equal.

If the rough-running values are formed by the differences of sequential segment times, then, for the misfire in the left portion, a comparatively large difference $d_1$ results which is clearly greater than the fluctuation width $d_5$ of the influences of the transducer wheel. In contrast, for the right part, a difference $d_3$ results which can be distinguished from the fluctuation width $d_5$ only with difficulty.

In order to reliably detect the misfire corresponding to the difference $d_3$, and according to the invention, the signal component occurring at the crankshaft frequency is filtered out before forming the rough-running value.

Figure 4A:
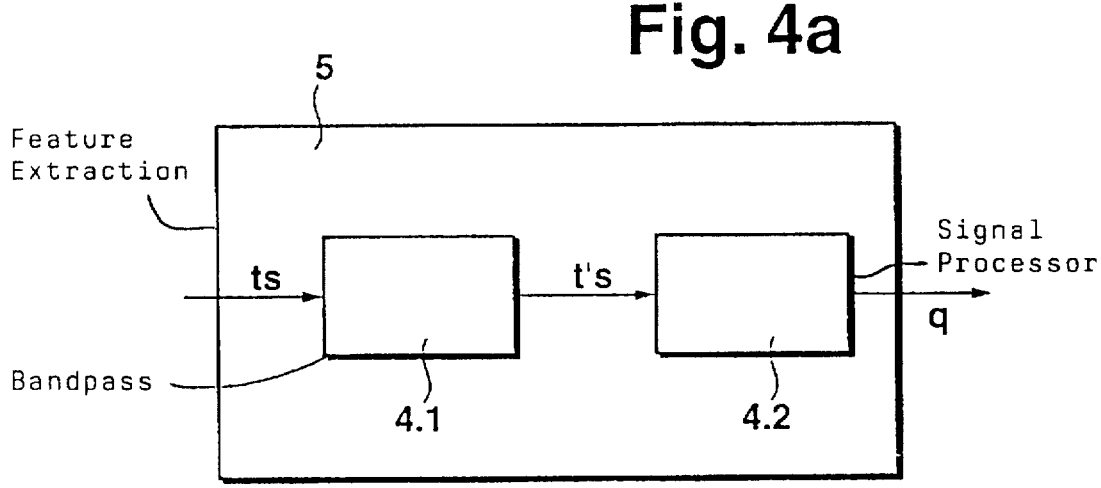
FIGS. 4a to 4c show the components of different frequencies of the segment-time signal and illustrate filtering utilizing a bandpass filter and filtering utilizing a comb-blocking filter.
Figure 4B:
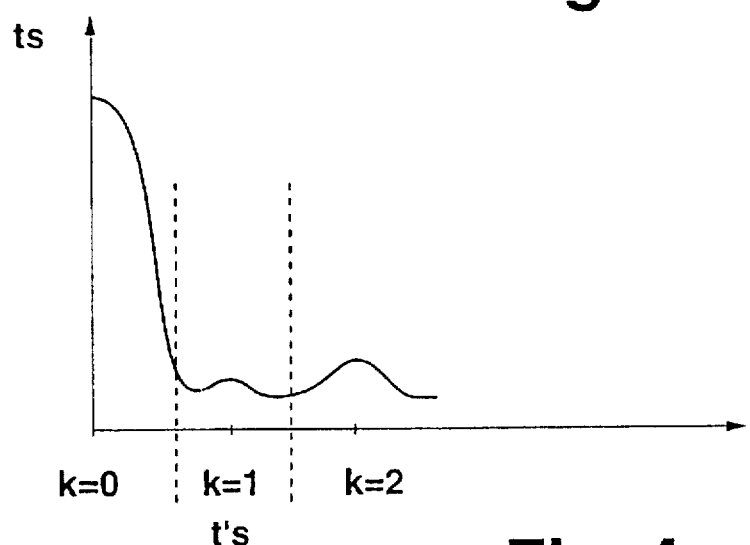

This is shown in FIG. 4a wherein the block 5 of the feature extraction of FIG. 1 is shown in detail. The segment-time signal ts is supplied by the sensor device to block 4.1. Block 4.1 permits only the signal component to pass which occurs at the camshaft frequency. Accordingly, the block 4.1 functions as a bandpass as is symbolized in FIG. 4b which shows the portion of different frequencies of the segment-time signal. The filtered signal is then processed in block 4.2 to a rough-running signal q and evaluated with respect to combustion misfires in the following classification stage.

Figure 4C:
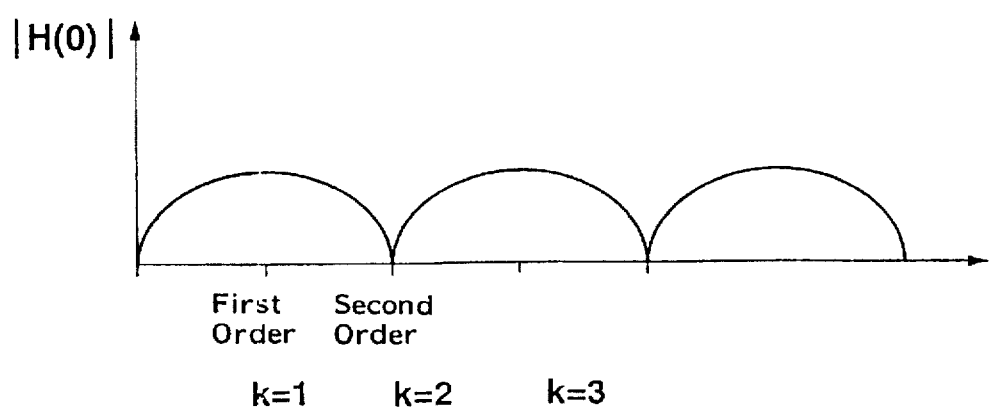

As an alternative to a bandpass function, the block 4.1 can also be configured as a comb-blocking filter. The magnitude of the transfer function H(0) of such a filter is plotted against the order k in FIG. 4c. The order k=1 identifies a signal component which occurs at the camshaft frequency. Permanent misfires in a cylinder occur, for example, at this frequency. Correspondingly, k=2 identifies the signal component occurring at twice the camshaft frequency et cetera. The comb-blocking filter has the transfer characteristic shown in FIG. 4c and blocks the crankshaft frequency and its harmonics with this transfer characteristic, that is, this filter only allows signal components to pass which are relevant to misfires.

Figure 5:
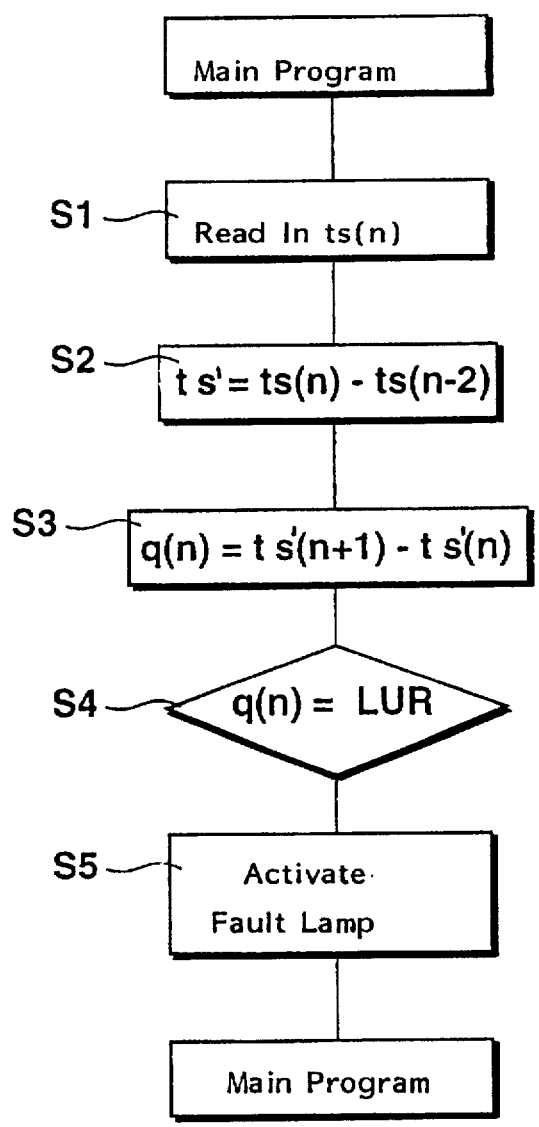
FIG. 5 shows a flowchart which is exemplary of an embodiment for performing the filtering in accordance with the invention.

An embodiment of the sequence of steps is shown in the flowchart of FIG. 5. This program can be a program module in a higher-ranking engine control program and can be processed via the control apparatus (5, 6) of FIG. 2 in synchronism with the rotational movement of the camshaft. In step S1, the segment times ts(n), which are provided by the sensor device, are read in in synchronism with the rpm and n identifies the numbers of the ignitions.

In step S2, the difference ts' of the sequentially occurring time segments ts is formed of those cylinders which are assigned to the same transducer wheel segment. Step S2 corresponds to an embodiment of the filter block 4.1. Thereafter, in step S3, rough-running feature signals q(n) are formed, for example, via the computation of q(n)=ts'(n+1) −ts'(n).

A rough-running value is transmitted to the classification stage and is there, for example, compared to a threshold value LUR (step S4). The threshold value LUR is, as may be required, dependent upon operating parameters of the engine and exceeding this threshold value is evaluated as a misfire. If this occurs with sufficient frequency, the fault lamp is activated in step S5.

Figure 6A:
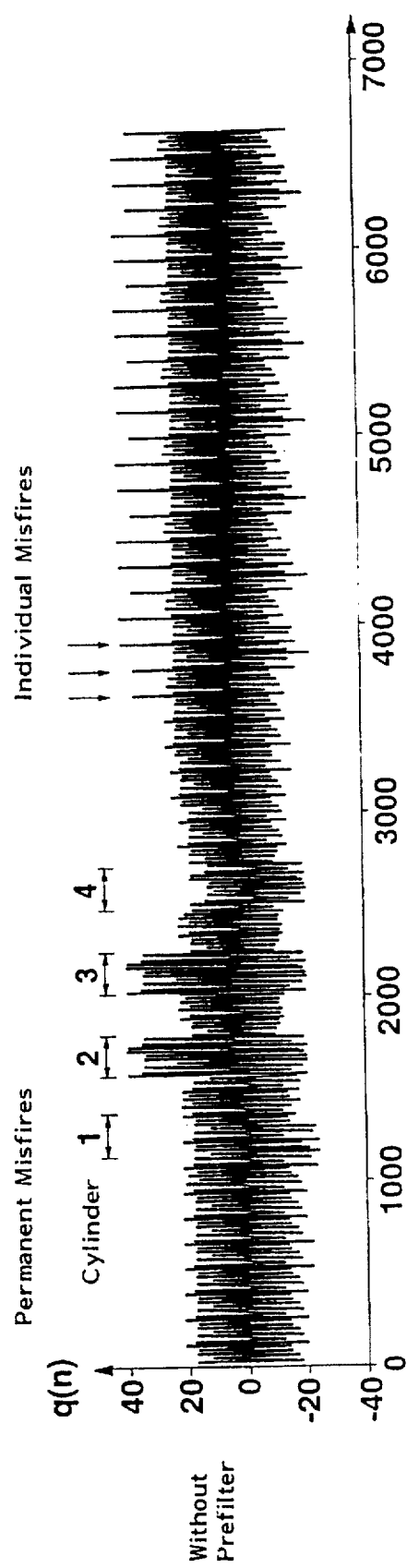
FIGS. 6a and 6b show the effect of the invention with respect to a comparison of rough-running values determined in accordance with the invention to rough-running values which are burdened with the influence of the transducer wheel.
Figure 6B:
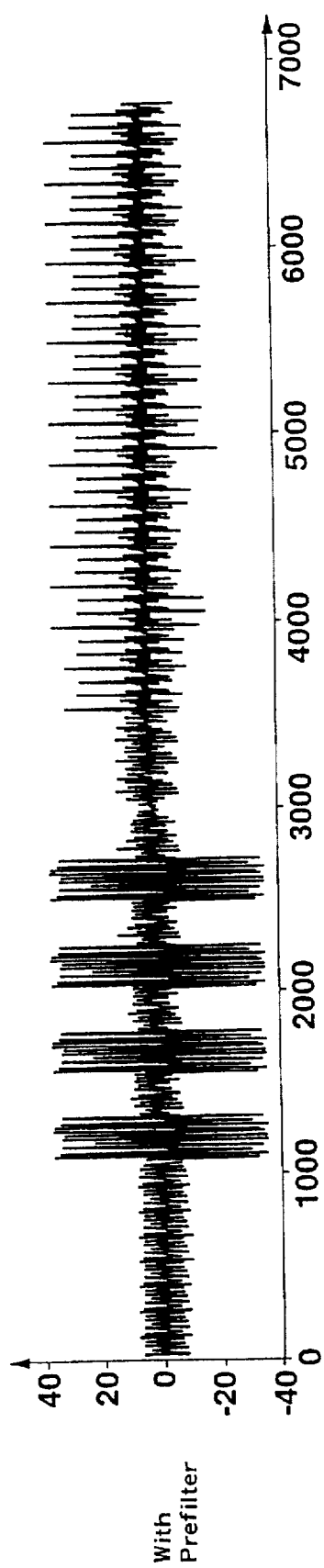

FIGS. 6a and 6b provide a comparison of feature signals q(n) which have been detected and include transducer-wheel inaccuracies. FIG. 6a shows the feature signal q(n) without prefiltering and FIG. 6b shows the feature signal q(n) with prefiltering. The feature signal q(n) in FIG. 6a can, for example, be formed via differences q(n)=ts(n)−ts(n−1) from sequentially occurring segment times of different segments.

The reliable detection of misfires is clearly recognizable in the method shown in FIG. 6b. As an alternative, the method can be carried out also on the side of the feature signals or the rough-running values q(n).

The feature signals q(n) or Lut(n) are, for example, formed as the difference of sequentially-occurring segment times. This difference is corrected by a term which compensates for a change of the mean rpm as it occurs, for example, during braking or acceleration of the vehicle.

Figure 7:
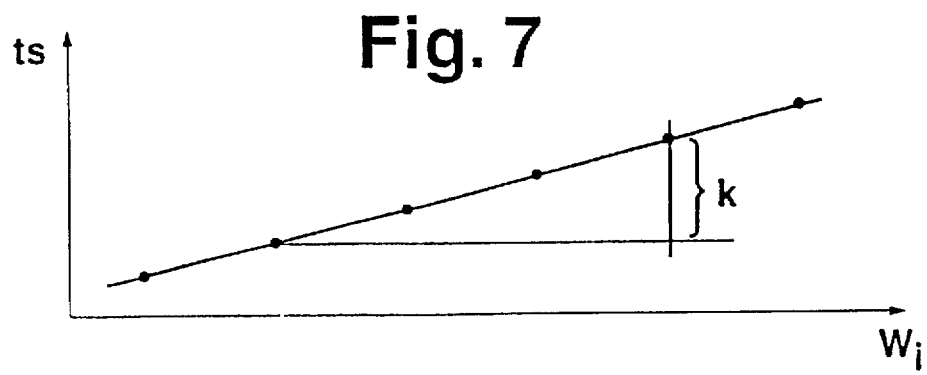
FIG. 7 shows the influence of changes of the rpm on the segment times.

FIG. 7 shows the influence of the changes in rpm on the detection of the time durations ts. Shown here is the case of a reduction in rpm as it occurs typically during overrun operation of a motor vehicle. This effect becomes manifest in a comparatively uniform lengthening of the detected times ts. To compensate for this effect, a corrective term K is formed which reflects the lengthening effect of the segment times identified by k in FIG. 7. This value k is considered when computing the rough-running values so that the lengthening effect is compensated.

This can take place via a computation of the slope of the segment-time trace or via a mean or median formation from several sequentially-occurring segment times.

Figure 8:
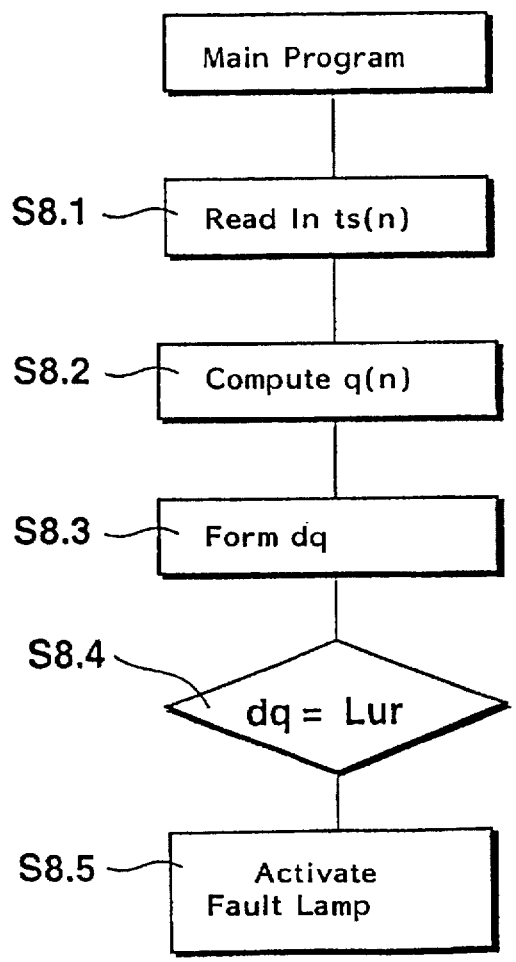
FIG. 8 is a second flowchart of a further embodiment of the method of the invention; and, FIGS. 9 and 10 show the signal traces as they occur with respect to the embodiment of FIG. 8 with and without dynamic compensation.

One possibility of compensation comprises subtracting the mean value of several previous segment times from the difference of the segment times. Via a subsequent division by the third power of a segment time ts(n), the rough-running values are normalized to the rpm. FIG. 8 shows a flowchart of this embodiment.

In step S8.1, the segment times ts(n), which are provided by the sensor device, are read in in synchronism with the rpm and n identifies the number of the ignitions. In step S8.2, rough-running values q(n) are formed in the manner described above. From these values, a difference dq is formed in step S8.3. For this purpose, rough-running values are applied which, mechanically, correspond to the same transducer wheel segment, that is, for example, rough-running values q(n) and q(n+z/2) wherein z corresponds to the number of cylinders of the engine. The value dq is compared to threshold value LUR in step S8.4. Such a threshold value is dependent, as required, on operating parameters of the engine and exceeding this threshold value is evaluated as a misfire. This leads to activation of the fault lamp in step S8.5 when the misfires occur with sufficient frequency.

Stated otherwise, a mechanical inaccuracy leads to a constant offset for the feature signals q(n); that is, the feature signals which are assigned to the same segment have the same level depending upon the absolute value of the segment fault.

The detection of misfires is possible independently of the segment fault via a difference formation of the LUT-values (feature signals) of the cylinders corresponding to the same segment.

Figure 9:
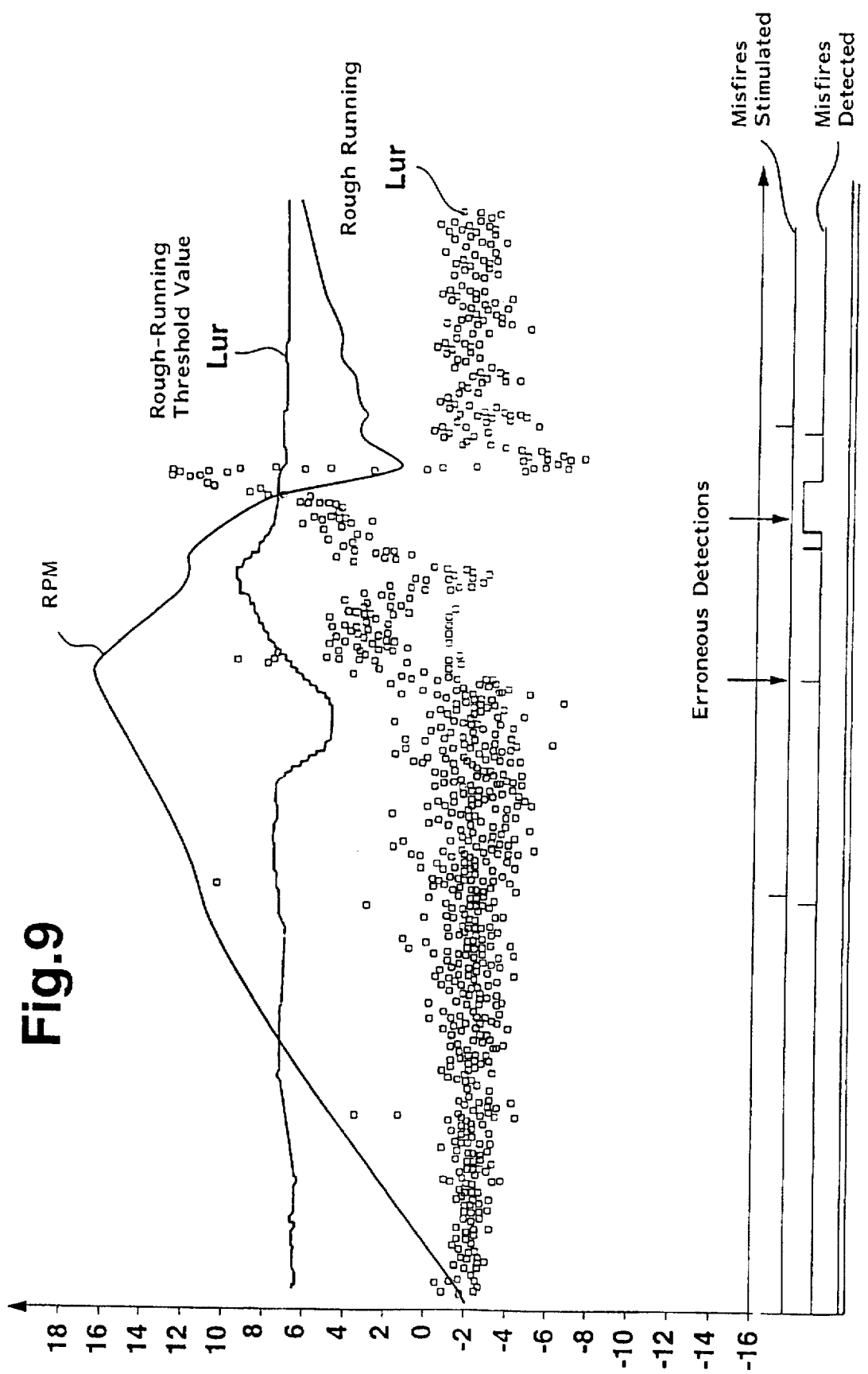

The dynamic compensation is essential in this embodiment. FIG. 9 shows the rough running for rpm changes without dynamic compensation. Erroneous detections are especially recognizable with a drop in rpm.

Figure 10:
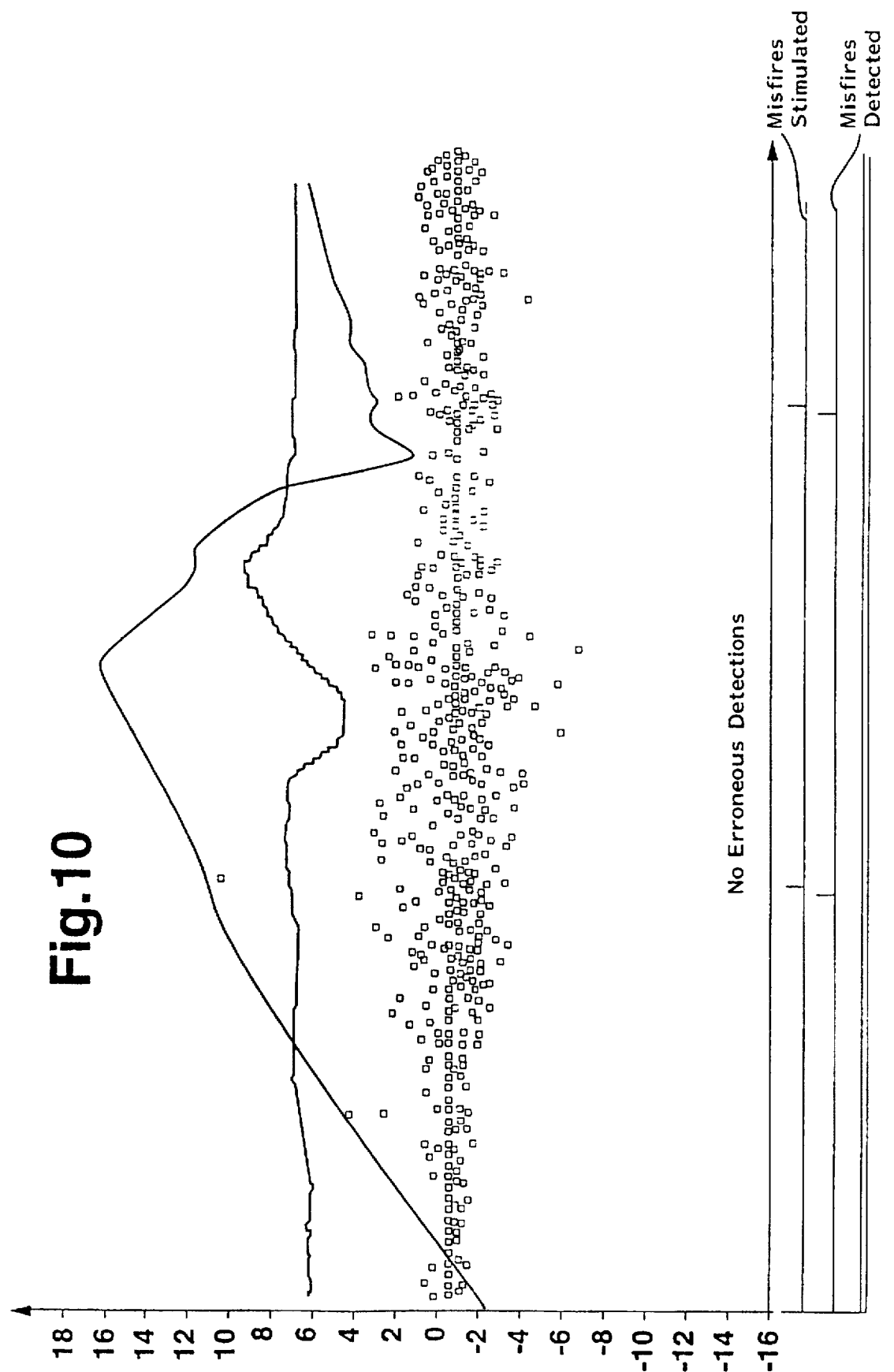

FIG. 10 shows comparable measurements with a dynamic compensation. Here, erroneous detections are no longer present.

The formation of the difference of rough-running values as described up to now applies to an engine with an even number z of cylinders dividable by two. In this case, z/2 segments can be defined on a transducer wheel rotating in phase synchronism with the crankshaft and each segment can be assigned to two cylinders. In a 4-cylinder engine having an ignition sequence 1-3-4-2 and ignitions distributed symmetrically over two crankshaft revolutions, the first and fourth cylinder can be assigned to one segment and the second and third cylinder can be assigned to the other segment.

In this embodiment of a 4-cylinder engine, the segments can extend, for example, from 0° to 180° crankshaft angle (CA), from 180° to 360° CA (of the first crankshaft rotation), from 0° to 180° CA and from 180° to 360° CA (of the second crankshaft rotation). Stated otherwise, for segments having the same size and lying symmetrically with respect to each ignition, two segments lie congruently with respect to each other and are marked by the same mechanical markings.

For an uneven number of cylinders z and ignitions distributed symmetrically over the crankshaft angle span of 720°, the individual ignitions are separated from each other by 720/z angle degrees, that is, for z=3 by 240 angle degrees, for z=5 by 144 angle degrees and so on. When the corresponding segments are in each case the same size and cannot be distinguished with respect to their position as to the particular ignition, the segments are no longer congruent. For example, the individual segments can extend for a 5-cylinder engine from 0° to 144° CA, from 144° to 288° CA, from 288° CA (of the first crankshaft rotation) to 72° CA (of the second crankshaft rotation) and from 72° to 216° CA and from 216° to 360° CA.

In each case, two segments assigned to different cylinders are thereby defined by different mechanical markings on the transducer wheel.

Under the precondition that a rough-running value is formed for each ignition, no two rough-running values q (which belong to different cylinders but to the same mechanical segment) are available for the formation of the difference dq within one work cycle (720° CA).

In order to nonetheless be able to carry out the method of the invention for engines having an uneven number of cylinders, two rough-running values are determined for each ignition. The first corresponds to the rough-running value q described previously and the second rough-running value (identified as q' hereinafter) is formed in the same manner as q was formed but on the basis of time segments displaced by 360° CA. The rough-running values q' formed in this manner are to some extent virtual values and are distinguished from the rough-running values q by their relative position to the ignitions. In the same manner as the formation of the additional rough-running values q', the detection of additional segment times ts' is advantageous when the number of cylinders is uneven and when the method is carried out by forming the segment-time differences.

It is understood that the foregoing description is that of the preferred embodiments of the invention and that various changes and modifications may be made thereto without departing from the spirit and scope of the invention as defined in the appended claims.

What is claimed is:

1. A method for detecting misfires in the combustion of a z-cylinder four stroke internal combustion engine, the engine including a transducer wheel coupled to the crankshaft of the engine and rotating in phase synchronism with said crankshaft, the method comprising the steps of:

causing said transducer wheel to have z/2 segments;

scanning said segments with a sensor device to supply a segment-time signal reflecting the nonuniformity of the rotational movement of the crankshaft with respect to individual ones of the cylinders of the engine;

forming rough-running values for each cylinder on the basis of the segment times with each of said rough-running values including a component occurring at the frequency of said crankshaft;

filtering out said component by forming differences between segment times which are assigned to the same transducer wheel segment;

then, comparing the filtered rough-running value to a threshold value;

determining a misfire to be present when said filtered rough-running value exceeds said threshold value;

for an even number of cylinders, detecting a segment time for each ignition;

for an uneven number of cylinders, additionally detecting the segment time for the mechanically same segment shifted by one crankshaft revolution; and, forming the difference of segment times, which segment times were detected for segments each shifted by 360° crankshaft angle.

2. A method for detecting misfires in the combustion of a z-cylinder four stroke internal combustion engine, the engine including a transducer wheel coupled to the crankshaft of the engine and rotating in phase synchronism with said crankshaft, the method comprising the steps of:

causing said transducer wheel to have z/2 segments;

scanning said segments with a sensor device to supply a segment-time signal reflecting the nonuniformity of the rotational movement of the crankshaft with respect to individual ones of the cylinders of the engine;

forming rough-running values for each cylinder on the basis of the segment times with each of said rough-running values including a component occurring at the frequency of said crankshaft;

filtering out said component by forming differences between rough-running values which are assigned to the same transducer wheel segment;

then, comparing the filtered rough-running value to a threshold value;

determining a misfire to be present when said filtered rough-running value exceeds said threshold value; and, compensating the influences of changes in rpm on said rough-running values.

* * * * *